US011677832B2

(12) United States Patent
Santhar et al.

(10) Patent No.: US 11,677,832 B2
(45) Date of Patent: Jun. 13, 2023

(54) VOICE ACTIVATED DEVICE ENABLING

(71) Applicant: INTERNATIONAL BUSINESS MACHINES CORPORATION, Armonk, NY (US)

(72) Inventors: Sathya Santhar, Chennai (IN); Sridevi Kannan, Chennai (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 17/448,548

(22) Filed: Sep. 23, 2021

(65) Prior Publication Data

US 2023/0090019 A1  Mar. 23, 2023

(51) Int. Cl.
*H04L 67/125* (2022.01)
*G10L 15/08* (2006.01)
*G06N 20/00* (2019.01)
*G10L 25/27* (2013.01)

(52) U.S. Cl.
CPC .......... *H04L 67/125* (2013.01); *G06N 20/00* (2019.01); *G10L 15/08* (2013.01); *G10L 25/27* (2013.01); *G10L 2015/088* (2013.01)

(58) Field of Classification Search
CPC ....... H04L 67/125; G06N 20/00; G10L 15/08; G10L 25/27; G10L 2015/088
See application file for complete search history.

(56) References Cited

U.S. PATENT DOCUMENTS

| 10,847,149 | B1 | 11/2020 | Mok | |
|---|---|---|---|---|
| 11,527,246 | B2 * | 12/2022 | Mixter | H04N 21/47217 |
| 2017/0272362 | A1 * | 9/2017 | Atlas | H04L 41/22 |
| 2018/0322870 | A1 * | 11/2018 | Lee | H04N 21/4394 |
| 2019/0266236 | A1 * | 8/2019 | Battach | G06N 3/0454 |

(Continued)

FOREIGN PATENT DOCUMENTS

WO    2021034038 A1    2/2021

OTHER PUBLICATIONS

Vilar et al., "A prediction classifier architecture to forecast device status on smart environments", IEEE International Conference on Systems, Man, and Cybernetics, Oct. 9, 2016.*

(Continued)

*Primary Examiner* — Todd L Barker
(74) *Attorney, Agent, or Firm* — Schmeiser, Olsen & Watts, LLP; Edward Wixted

(57) ABSTRACT

A system, method, and computer program product for implementing voice activated hardware device enabling is provided. The method includes receiving an instruction set comprising initialization commands associated with initializing a non-specific device of a plurality of devices. The instruction set is analyzed and it is determined that specified instruction keywords are located within the initialization commands. The initialization commands are inputted into a bidirectional encoder representations from transformers (BERT) model classifier component and a specified device associated with the instruction set is classified. As a result, it is determined if a maximum threshold is reached for any class of devices and the specified device is assigned as a desired device. In response, the specified device is enabled with respect to an operationally functional state.

14 Claims, 15 Drawing Sheets

(56) References Cited

U.S. PATENT DOCUMENTS

2019/0371342 A1    12/2019  Tukka
2021/0104220 A1*   4/2021   Mennicken ............. G06F 3/165
2021/0183393 A1*   6/2021   Lee ......................... G10L 15/22

OTHER PUBLICATIONS

Sarnie et al., "Hierarchical Classification for Constrained IoT Devices: A Case Study on Human Activity Recognition", IEEE Internet of Things Jounral, vol. 7, No. 9, Sep. 2020.*

Anonymous; Method and System for AI Voice Assistance System to Offer Help; IP.com; IPCOM000165423D; Apr. 8, 2021; 5 pages.

Mell, Peter et al.; "The NIST Definition of Cloud Computing;" National Institute of Standards and Technology; Special Publication 800-145; Sep. 2011; 7 pages.

Summerson, Cameron; How to Enable and Use Continued Conversation on Google Home; https://www.howtogeek.com/357104/how-to-enable-and-use-continued-conversation-on-google-home/; Mar. 8, 2019; 10 pages.

* cited by examiner

VOICE ACTIVATED DEVICE ENABLING

BACKGROUND

The present invention relates generally to a method for enabling a voice activated device and in particular to a method and associated system for improving voice activated software technology associated with receiving initialization commands, classifying a device, and enabling the device with respect to an operationally functional state.

SUMMARY

A first aspect of the invention provides a server comprising a processor coupled to a computer-readable memory unit, the memory unit comprising instructions that when executed by the processor implements a multiple voice activated hardware device enabling method comprising: receiving, by a processor of a server, an instruction set comprising initialization commands associated with initializing at least one non-specific device of a plurality of devices; analyzing, by the processor, the instruction set; first determining, by the processor in response to results of the analyzing, that specified instruction keywords are located within the initialization commands; inputting, by the processor in response to results of the first determining, the initialization commands into a bidirectional encoder representations from transformers (BERT) model classifier component; classifying, by the processor executing the BERT model classifier component, at least one specified device of the plurality of devices associated with the instruction set; second determining, by the processor based on a probability output from the BERT model classifier component, if a maximum threshold is reached for any class of devices; assigning, by the processor in response to results of the second determining, the at least one specified device as at least one desired device; and enabling, by the processor in response to at least one instruction keyword of the instruction keywords and results of the assigning, the at least one specified device with respect to an operationally functional state.

A second aspect of the invention provides a multiple voice activated hardware device enabling method comprising: receiving, by a processor of a server, an instruction set comprising initialization commands associated with initializing at least one non-specific device of a plurality of devices; analyzing, by the processor, the instruction set; first determining, by the processor in response to results of the analyzing, that specified instruction keywords are located within the initialization commands; inputting, by the processor in response to results of the first determining, the initialization commands into a bidirectional encoder representations from transformers (BERT) model classifier component; classifying, by the processor executing the BERT model classifier component, at least one specified device of the plurality of devices associated with the instruction set; second determining, by the processor based on a probability output from the BERT model classifier component, if a maximum threshold is reached for any class of devices; assigning, by the processor in response to results of the second determining, the at least one specified device as at least one desired device; and enabling, by the processor in response to at least one instruction keyword of the instruction keywords and results of the assigning, the at least one specified device with respect to an operationally functional state.

A third aspect of the invention provides a computer program product, comprising a computer readable hardware storage device storing a computer readable program code, the computer readable program code comprising an algorithm that when executed by a processor of a server implements a multiple voice activated hardware device enabling method, the method comprising: receiving, by the processor, an instruction set comprising initialization commands associated with initializing at least one non-specific device of a plurality of devices; analyzing, by the processor, the instruction set; first determining, by the processor in response to results of the analyzing, that specified instruction keywords are located within the initialization commands; inputting, by the processor in response to results of the first determining, the initialization commands into a bidirectional encoder representations from transformers (BERT) model classifier component; classifying, by the processor executing the BERT model classifier component, at least one specified device of the plurality of devices associated with the instruction set; second determining, by the processor based on a probability output from the BERT model classifier component, if a maximum threshold is reached for any class of devices; assigning, by the processor in response to results of the second determining, the at least one specified device as at least one desired device; and enabling, by the processor in response to at least one instruction keyword of the instruction keywords and results of the assigning, the at least one specified device with respect to an operationally functional state.

The present invention advantageously provides a simple method and associated system capable of automating voice activated device enabling.

DETAILED DESCRIPTION

Figure 1:
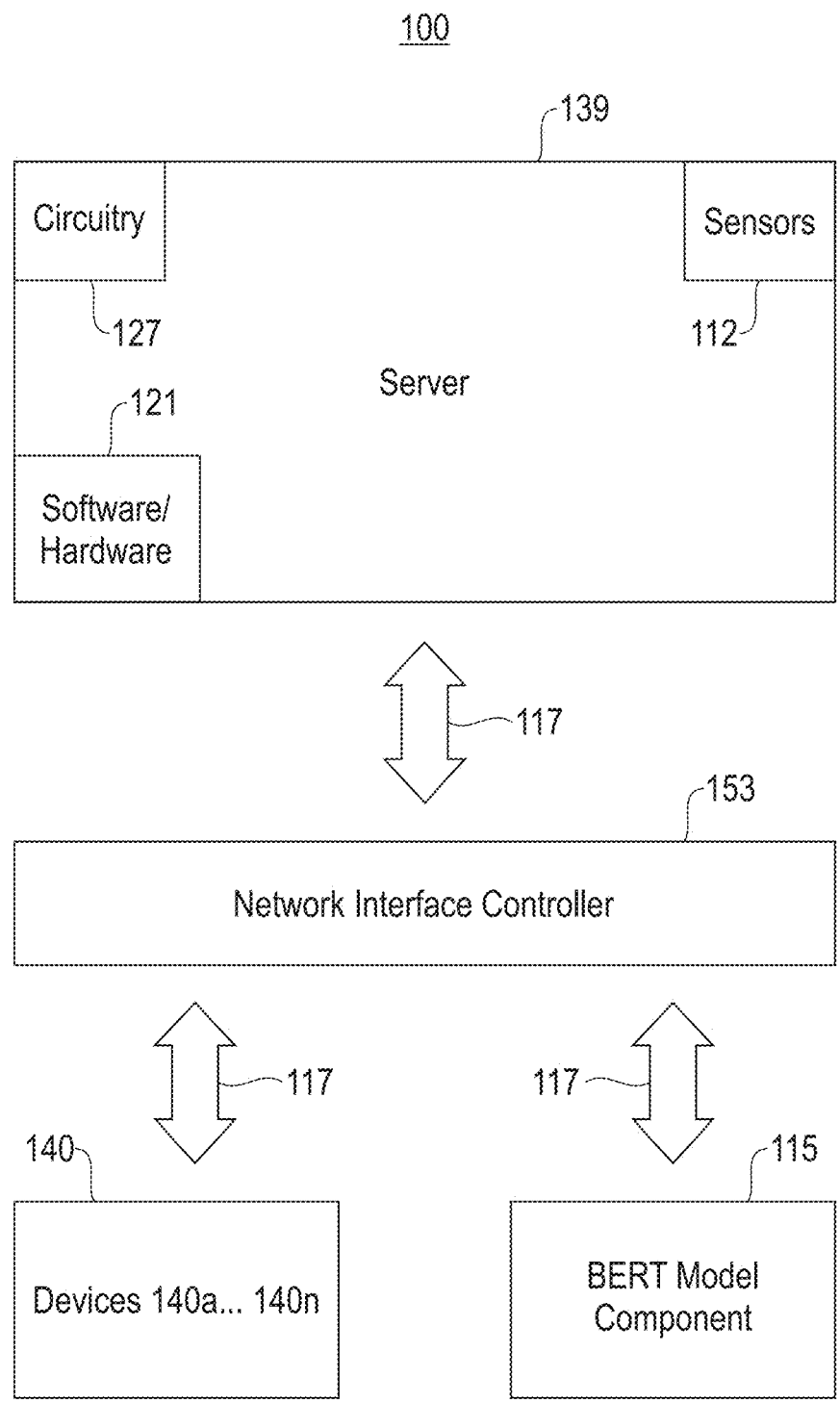
FIG. 1 illustrates a system for improving voice activated software technology associated with receiving initialization commands, classifying a device, and enabling the device with respect to an operationally functional state, in accordance with embodiments of the present invention.

FIG. 1 illustrates a system 100 for improving voice activated software technology associated with receiving initialization commands, classifying a device, and enabling the device with respect to an operationally functional state, in accordance with embodiments of the present invention. Typical voice assistance systems may require a process for receiving voice commands from a user. Prior to receiving a voice command, a user is required to submit a wakeup command to cause a device to awaken and receive the voice command. Current voice enabled devices may receive voice commands individually and each device may be associated with a different wakeup command such that the devices may be recognized individually. Usage of a fixed wakeup command may require a user to specify the fixed wakeup command to awaken the device for listening to voice commands. Likewise, calling out the wakeup command for each activity and each device may be time consuming and frustrating considering an increase in a number of voices enabled devices at home and in the office thereby causing difficulty with respect to maintaining a record of wake-up commands for all devices. Therefore, system 100 enables devices for extracting associated keywords and/or phrases from any submitted voice command based on a historical learning process associated with a command sequence for a same or different smart devices. Likewise, system 100 is configured to dynamically set an alternate wakeup command for one or more device such that a user may not have to submit a fixed wakeup command every time a device wake up is required.

System 100 enables a historical learning process with respect to a command sequence for same or different (voice activated) devices. The devices are configured to extract appropriate keyword and/or phrases from any submitted voice command. Likewise, the devices may be configured to dynamically set an alternate wakeup command for one or more devices such that a user is not required to submit a fixed wakeup command every time a device activation is necessary.

System 100 of FIG. 1 includes a server 139, voice activated devices 140a . . . 140n, a bidirectional encoder representations from transformers (BERT) model component 115, and a network interface controller interconnected through a network 117. Server 139 comprises sensors 112, circuitry 127, and software/hardware 121. Voice activated devices 140a . . . 140n may comprise any type of hardware based voice activated device including, inter alia, a virtual reality device, a voice activated computing device, etc. Server 139, voice activated devices 140a . . . 140n, and BERT model component 115 each may comprise an embedded device(s). An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server 139, voice activated devices 140a . . . 140n, and BERT model component 115 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-6. The specialized discrete non-generic analog, digital, and logic-based circuitry (e.g., sensors 112, circuitry/logic 127, software/hardware 121, etc.) may include proprietary specially designed components (e.g., a specialized integrated circuit, such as for example an Application Specific Integrated Circuit (ASIC) designed for only implementing an automated process for improving voice activated software technology associated with receiving initialization commands, classifying a device, and enabling the device with respect to an operationally functional state. Sensors 112 may include any type of internal or external sensors including, inter alia, GPS sensors, Bluetooth beaconing sensors, cellular telephone detection sensors, Wi-Fi positioning detection sensors, triangulation detection sensors, activity tracking sensors, a temperature sensor, an ultrasonic sensor, an optical sensor, a video retrieval device, humidity sensors, voltage sensors, network traffic sensors, etc. Network 117 may include any type of network including, inter alia, a local area network, (LAN), a wide area network (WAN), the Internet, a wireless network, etc.

System 100 is enabled to execute a process for enabling a voice activated device as follows:

System 100 is configured to contextually classify a voice activated instruction set retrieved with respect to differing time steps for various voice enabled or Internet of Things (IoT) devices controlled by a voice enabled software/hardware coordinator. The classification process is enabled by allowing instructions to flow through staged sequence models to enable devices to wake up without usage of wakeup keywords presented each time an instruction is fired. Likewise, it is not necessary to determine a device for receiving a current instruction set. Staged sequence models may include a trigger word detection model for constantly detecting a defined trigger word for each device. Additionally, staged sequence models may include a trigger word detection model for providing an instruction classified by the staged sequence model to be applied to a specified device thereby eliminating a need for a continuous a trigger word.

A staged sequence model may be trained with respect to a start keyword to recognize as an instruction to differentiate between commonly spoken words and an instruction set. The start keyword is different from a trigger word and is not configured to wake up any device. Likewise, the start keyword is configured to classify a sentence as an instruction set intended for device activation.

If sequence model probabilities do not specify a clear difference between devices, then a current instruction set and an immediate previous instruction set is fed into a BERT model to identify if the current instruction set comprises a next instruction set. The BERT model may be different for each device. Alternatively, the BERT model may be the same for each device and comprise two outputs: a first output may be associated with an intended device and a second output associated with a binary classifier to indicate that both sentences are in sequence.

If there is no previous instruction set, then an associated ambiguity may be clarified with the user via specific questions related to a device associated with instructions and a last stage of a model.

A transfer learning process may be enabled for all models with each stage of a model pre-trained with a generic instruction set associated with the system learning about devices within a closed environment with respect to user-device interaction processes. Initially there may exist ambiguity questions for users, but when the system executes a self-learning process, an output may be generated to awaken a specific device within earlier stages of the model itself.

Figure 2:
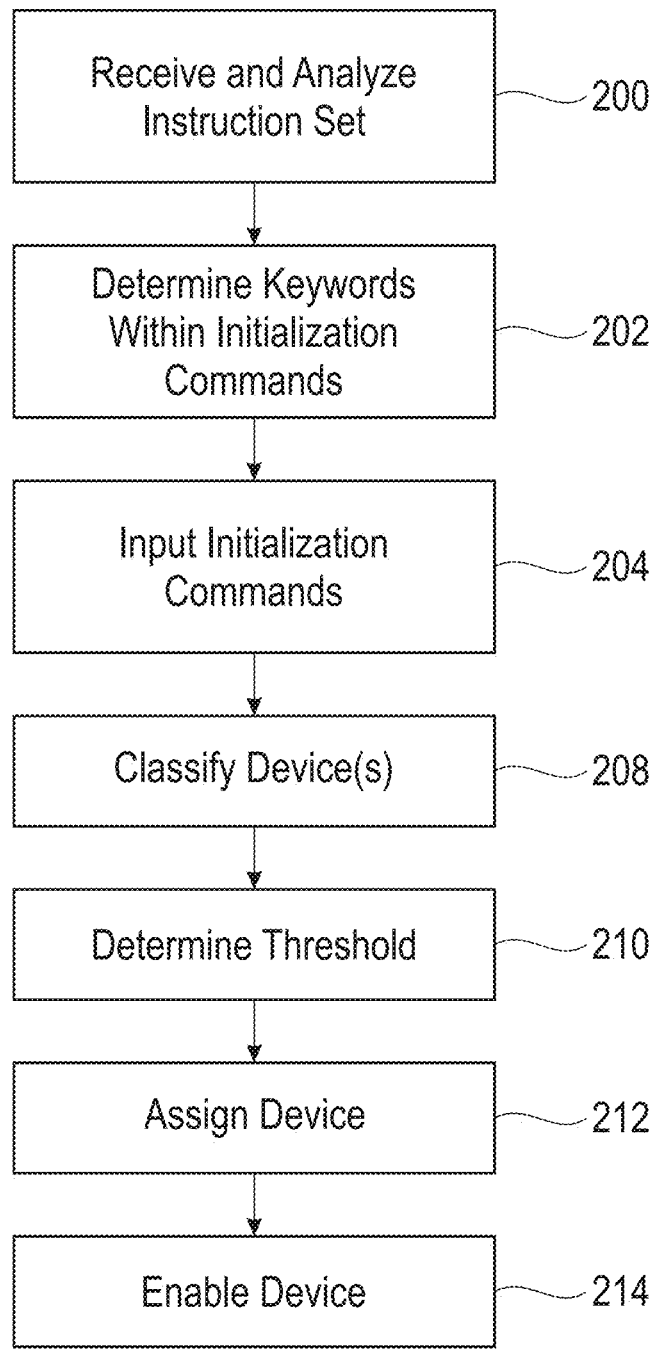
FIG. 2 illustrates an algorithm detailing a process flow enabled by the system of FIG. 1 for improving voice activated software technology associated with receiving initialization commands, classifying a device, and enabling the device with respect to an operationally functional state, in accordance with embodiments of the present invention.

FIG. 2 illustrates an algorithm detailing a process flow enabled by system 100 of FIG. 1 for improving voice activated software technology associated with receiving initialization commands, classifying a device, and enabling the device with respect to an operationally functional state, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server 139, voice activated devices 140a . . . 140n, and BERT model component 115. In step 200, an instruction set is received and analyzed by a server. The instruction set comprises initialization commands associated with initializing at least one non-specific device of a plurality of devices. The instruction set may further include voice activated commands associated with smart devices.

In step 202, it is determined (in response to results of the analysis of step 200) that specified instruction keywords are located within the initialization commands. In step 204, the initialization commands are inputted into a bidirectional encoder representations from transformers (BERT) model classifier component. In step 208, at least one specified device associated with the instruction set is classified execution of the BERT model classifier component. Classifying the at least one specified device may include: executing a set of instructions and (in response) generating an output defining a probability associated with a corresponding device with respect to the set of instructions.

In step 210, it is determined (based on a probability output from the BERT model classifier component) if a maximum threshold is reached for any class of devices. Results of the determination may indicate that the maximum threshold is reached for any class of devices and a voice controlled assistant may acknowledge the instruction set. In response, a trigger signal for enabling the at least one specified device may be generated. Alternatively, results of the determination may indicate that the maximum threshold is not reached for any class of devices and a voice controlled assistant may acknowledge the instruction set such that a context request for the user with respect to the instruction set is initiated.

In step 212, the at least one specified device is assigned as at least one desired device in response to results of step 210. The assigning process may include predicting a corresponding class related to a previous context of the instruction set. Alternatively, the assigning process may include initiating a user request for retrieving information associated with a user selected device associated with the instruction set.

In step 214, the at least one specified device is enabled with respect to an operationally functional state in response to at least one instruction keyword of the instruction keywords and results of the assigning of step 212. The at least one specified device may include a first device and a second device. The first device may be maintained with respect to the operationally functional state in response to a second instruction keyword of the instruction keywords. Likewise, the second device may be disabled with respect to the operationally functional state in response to the second instruction keyword.

Figure 3:
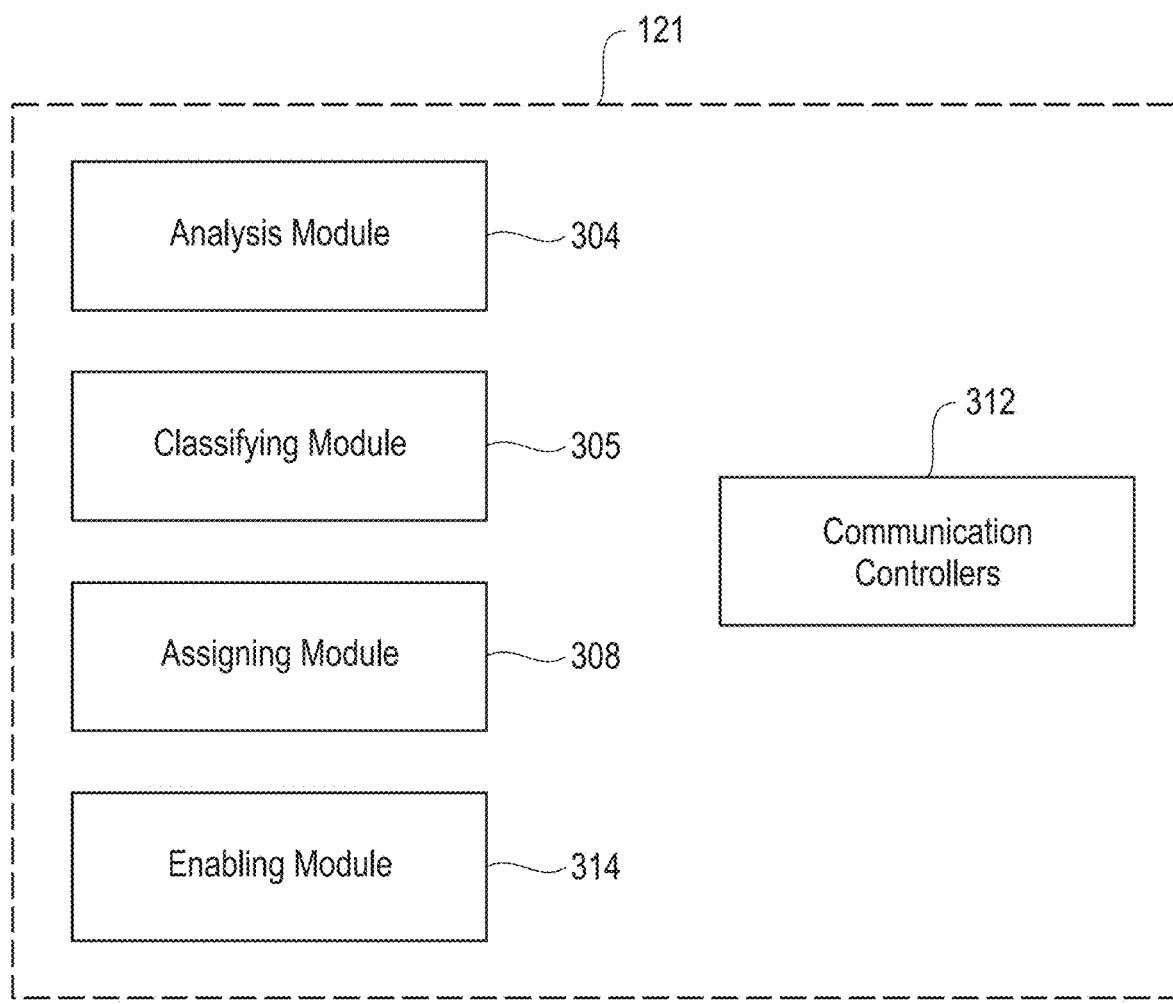
FIG. 3 illustrates an internal structural view of the software/hardware of FIG. 1, in accordance with embodiments of the present invention.

FIG. 3 illustrates an internal structural view of software/hardware 121 (i.e., 121) of FIG. 1, in accordance with embodiments of the present invention. Software/hardware 121 includes an analysis module 304, a classifying module 305, an assigning module 308, an enabling module 314, and communication controllers 312. Analysis module 304 comprises specialized hardware and software for controlling all functions related to the analyzing steps of FIG. 2. Classifying module 305 comprises specialized hardware and software for controlling all functionality related to the classification steps described with respect to the algorithm of FIG. 2. Assigning module 308 comprises specialized hardware and software for controlling all functions related to the assigning steps of FIG. 2. Enabling module 314 comprises specialized hardware and software for controlling all functions related to the device functionality enabling steps of the algorithm of FIG. 2. Communication controllers 312 are enabled for controlling all communications between analysis module 304, classifying module 305, assigning module 308, and enabling module 314.

Figure 4:
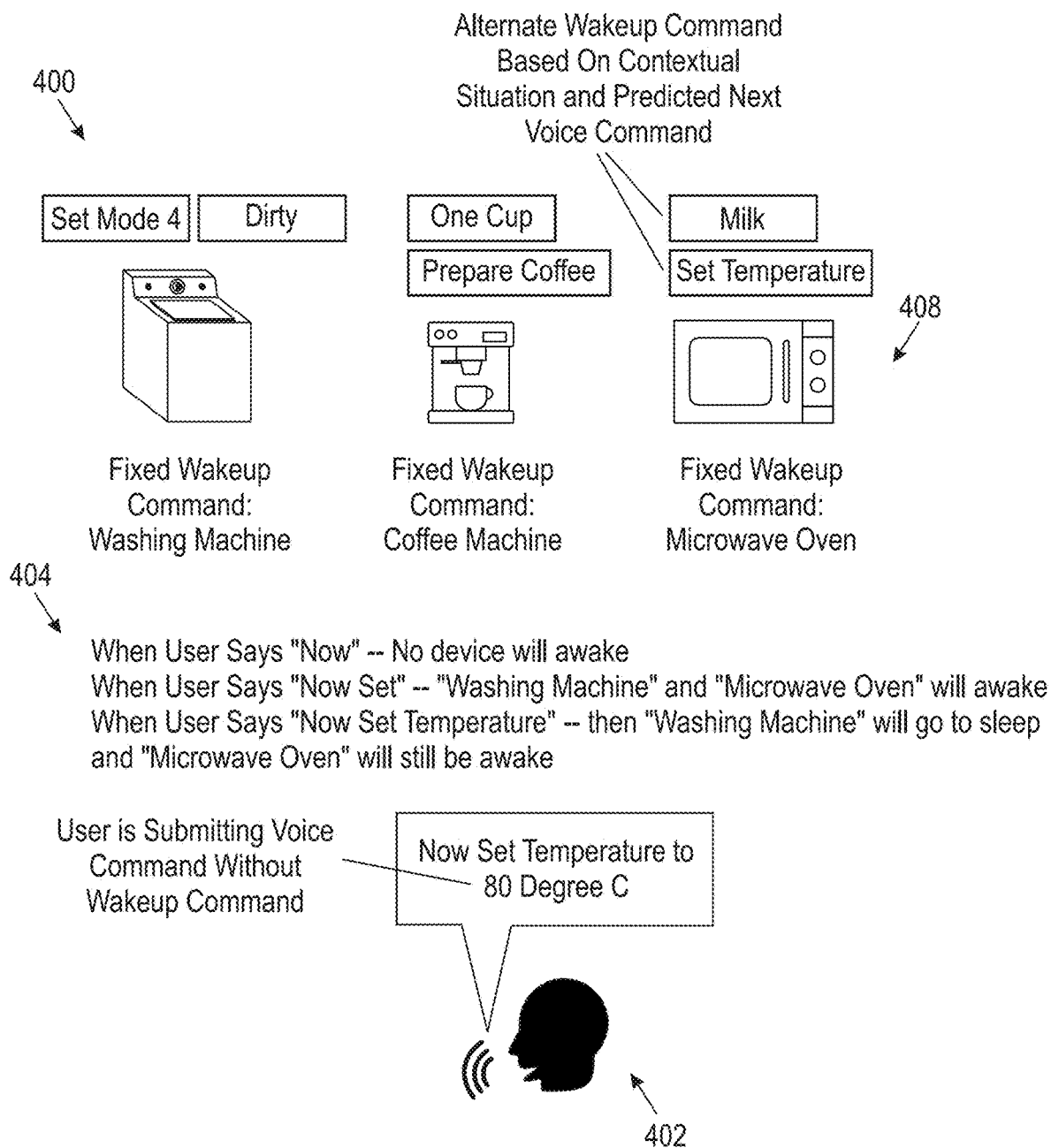
FIG. 4 illustrates a system implementing an example for generating a dynamic wakeup command for control of devices, in accordance with embodiments of the present invention.
Figure 5A:
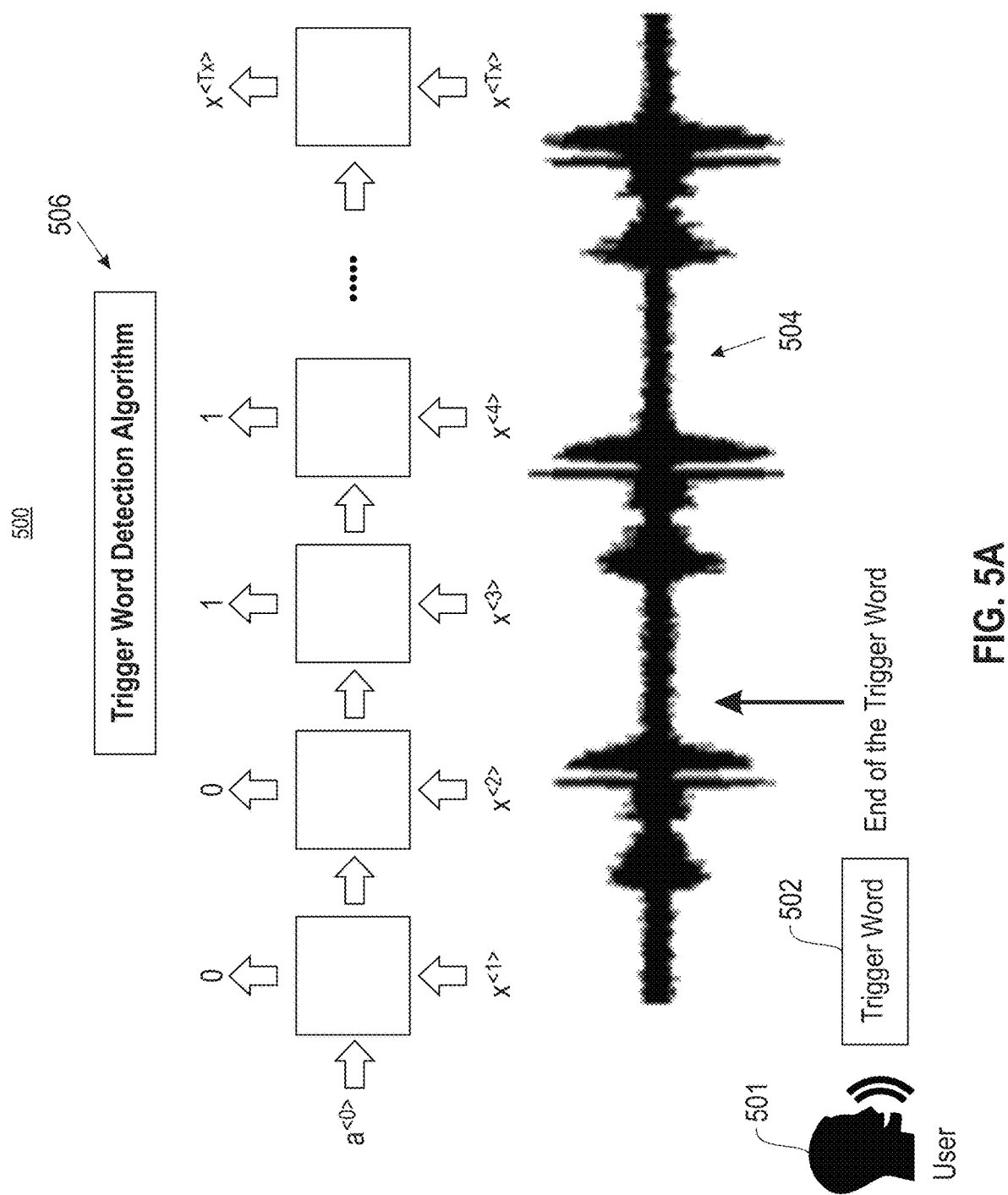
FIGS. 5A-5H illustrate an activity based flow for generating a dynamic wakeup command for control of devices, in accordance with embodiments of the present invention.
Figure 5B:
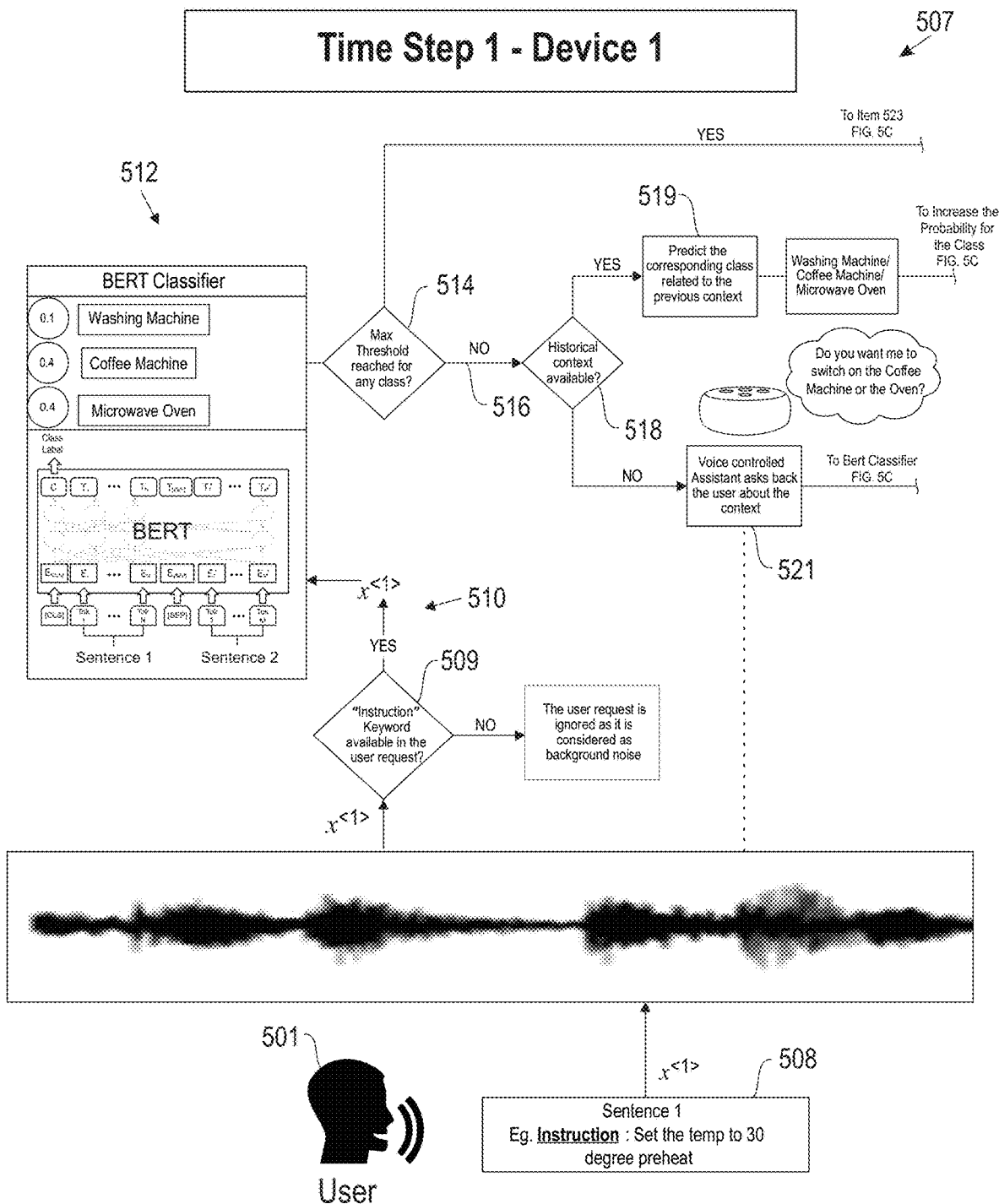
Figure 5C:
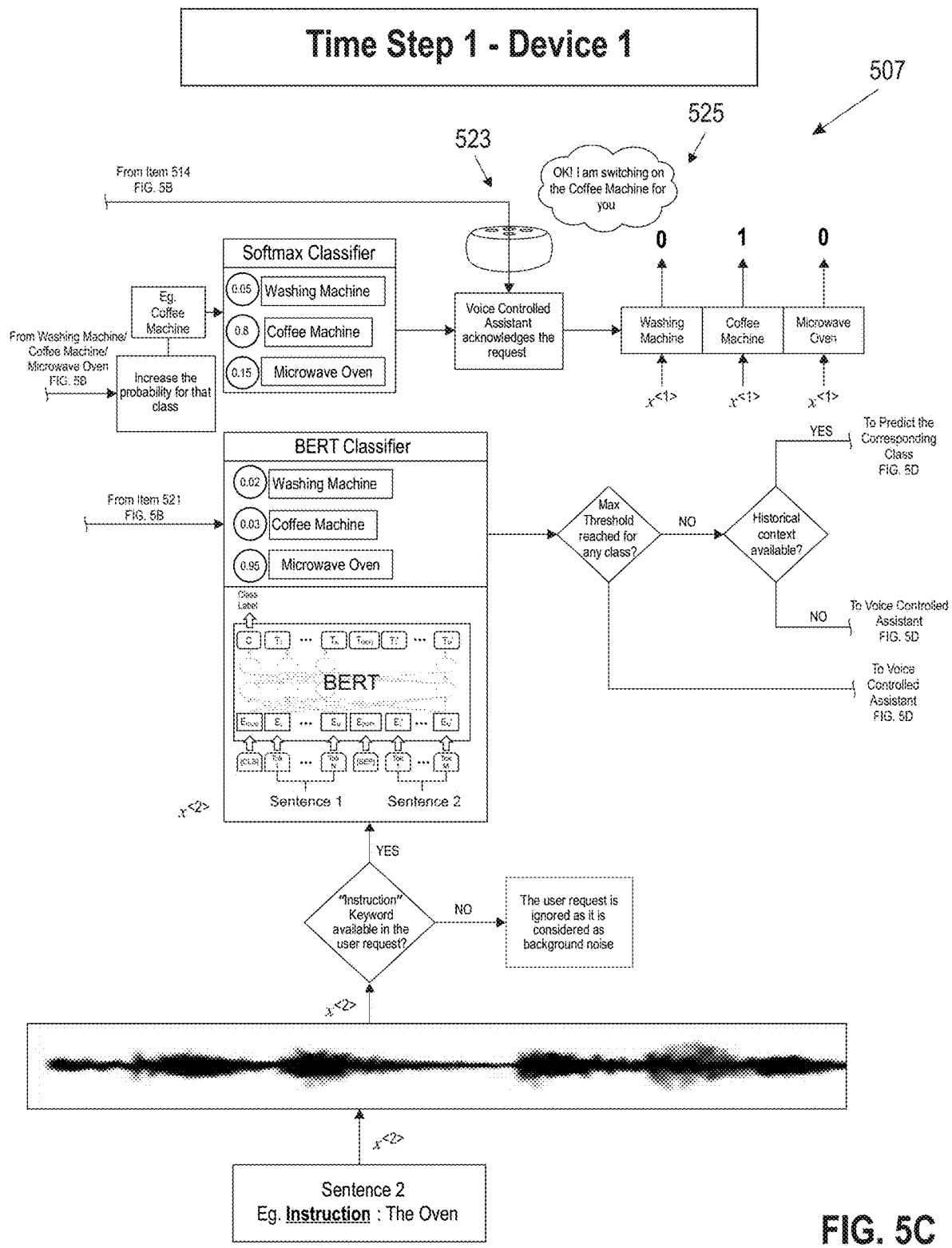
Figure 5D:
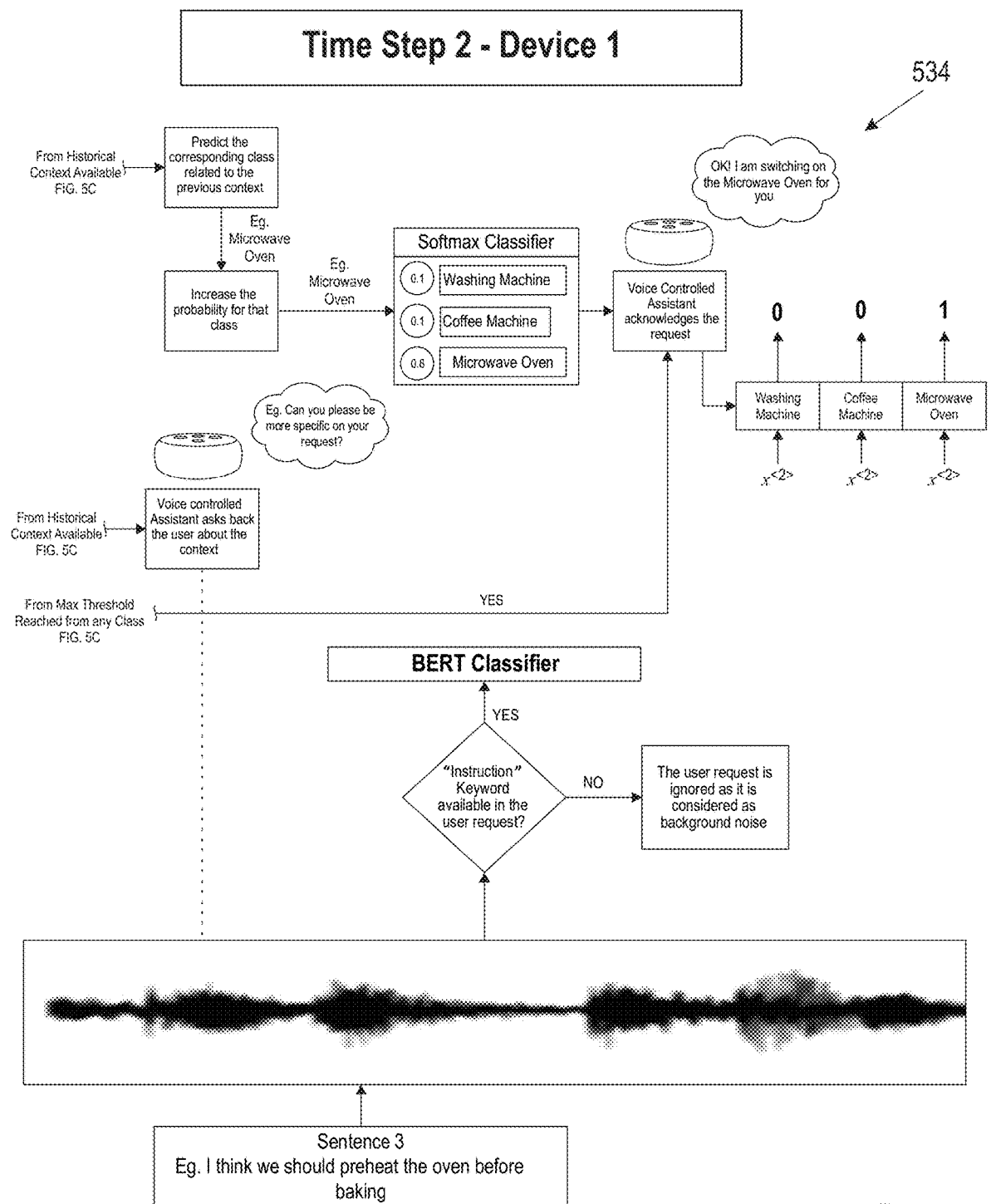
Figure 5E:
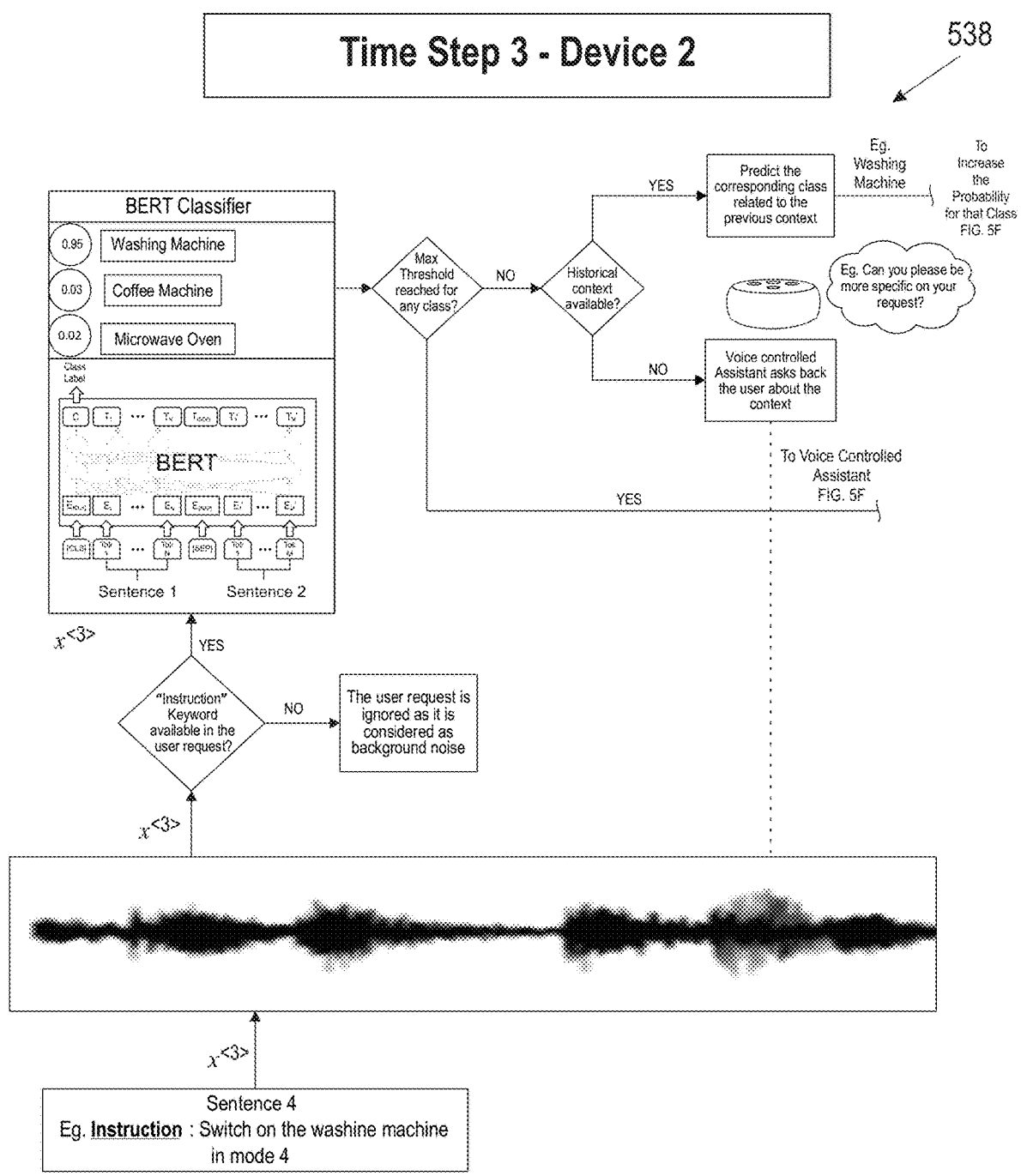
Figure 5F:
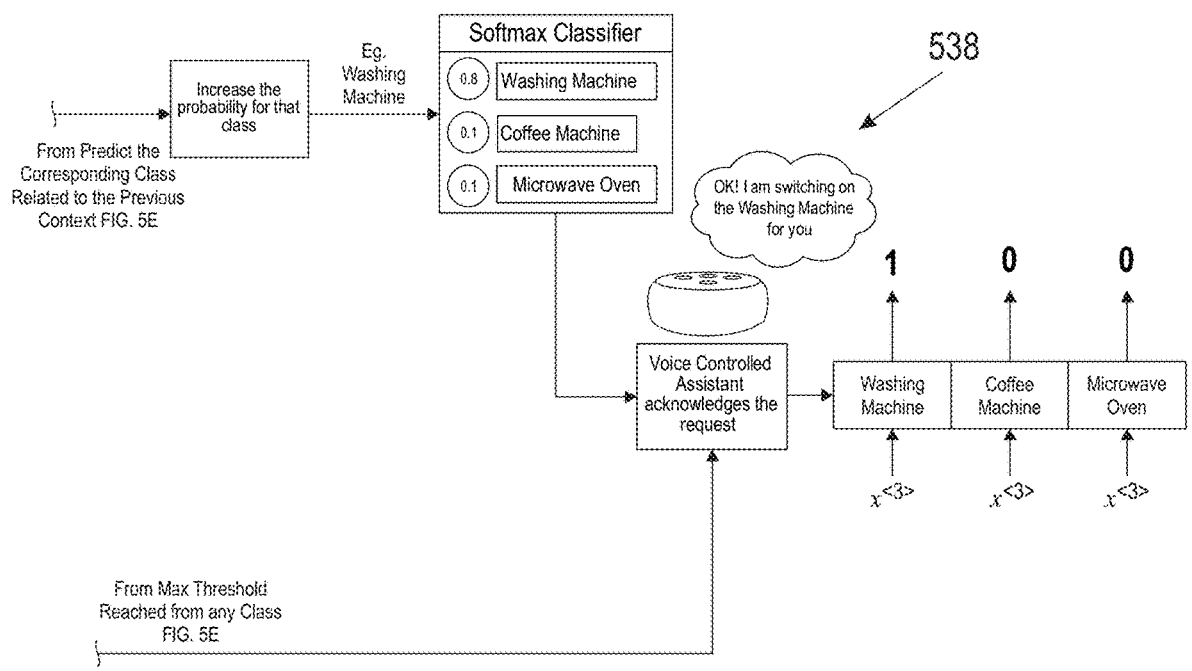
Figure 5F:
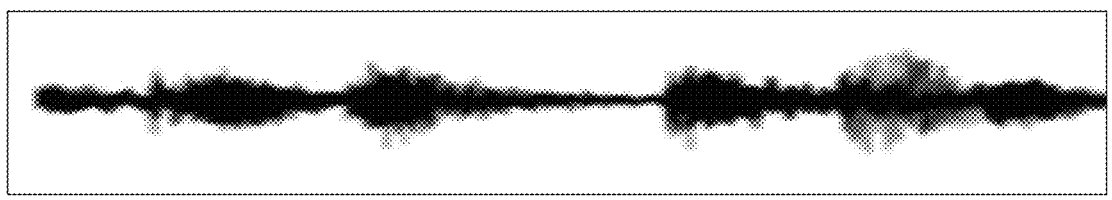
Figure 5G:
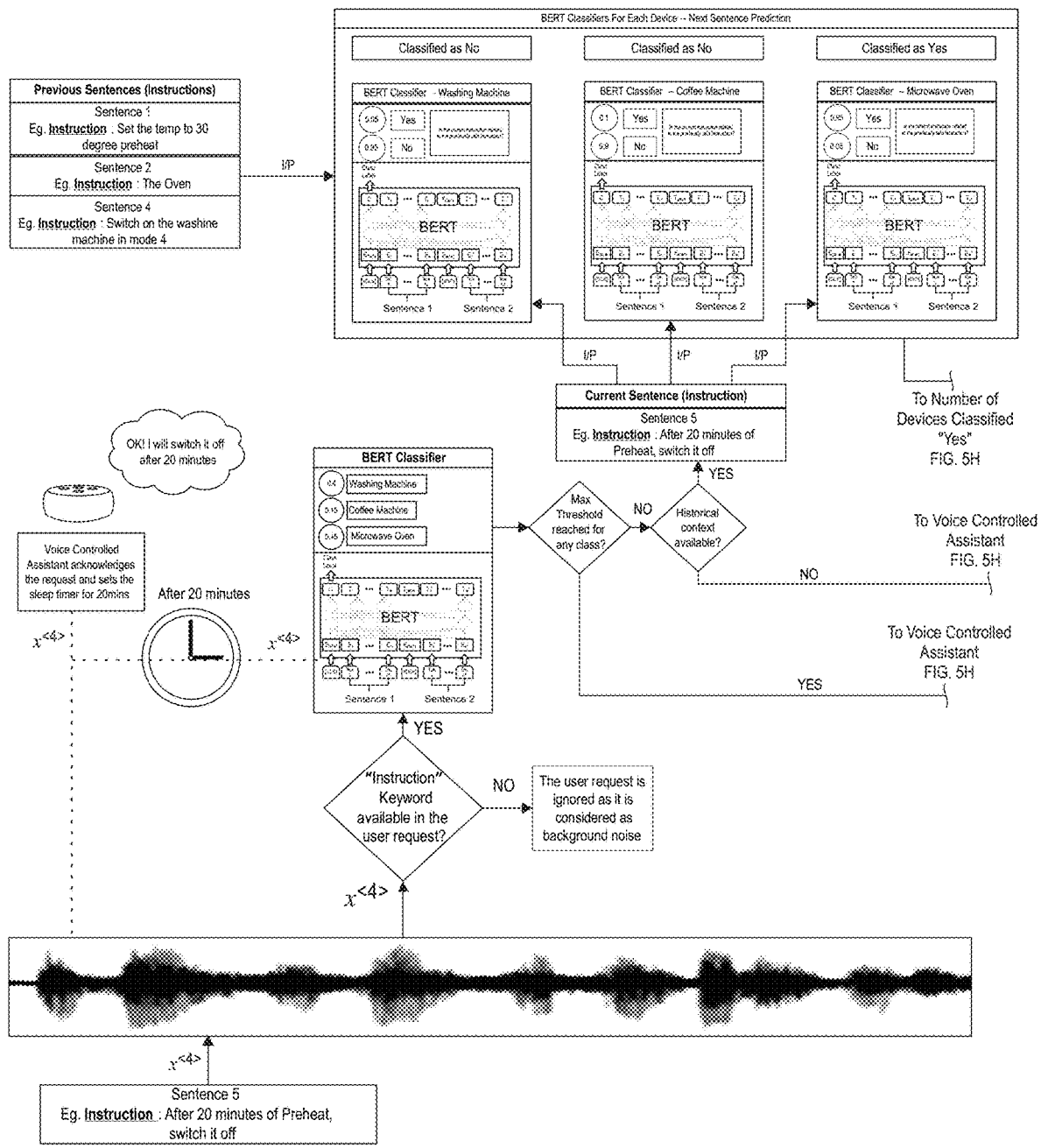
Figure 5H:
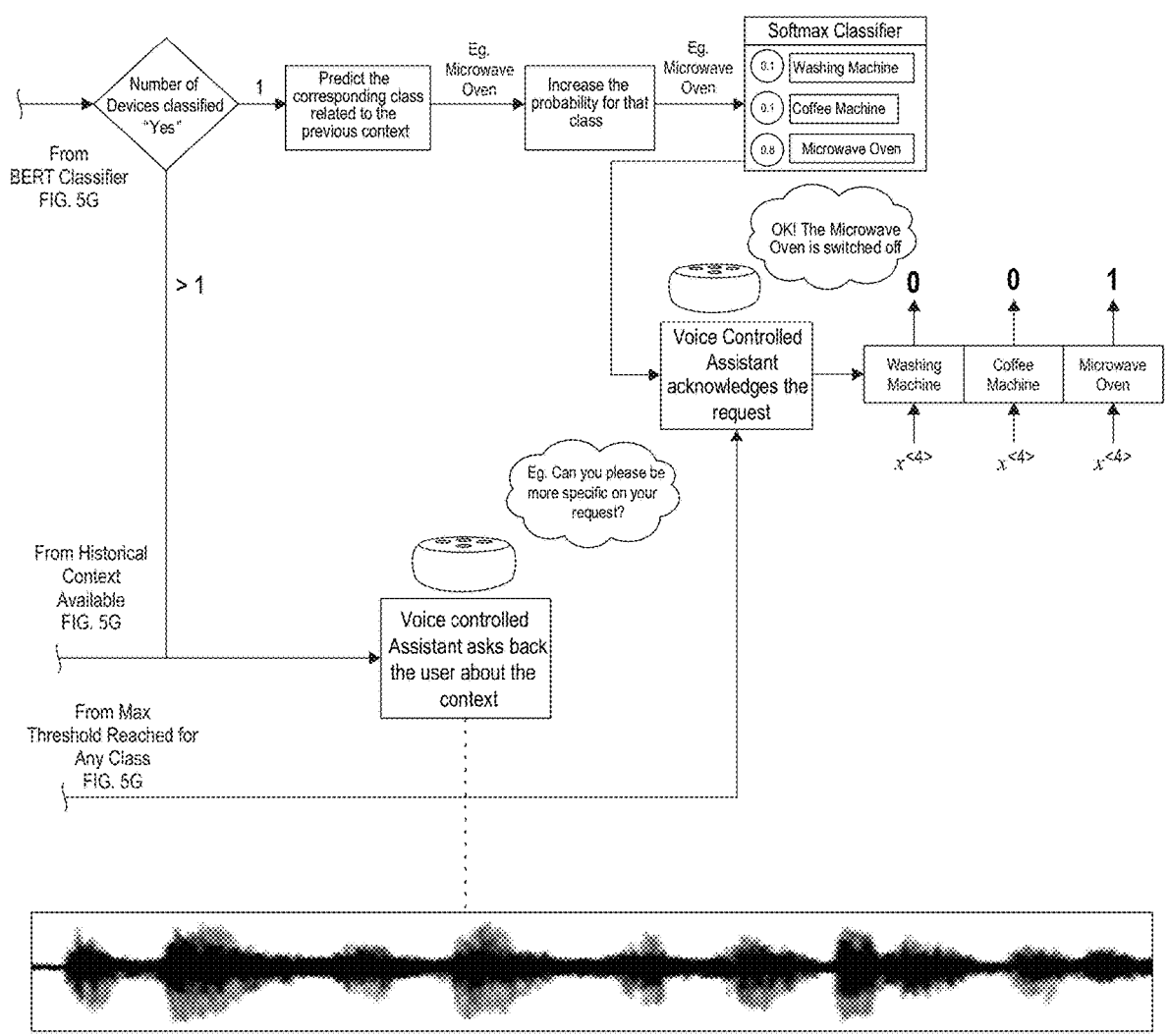

FIG. 4 illustrates a system 400 implementing an example for generating a dynamic wakeup command for control of devices 408, in accordance with embodiments of the present invention. System 400 is configured to enable a historical learning process with respect to smart device (predicted) voice commands being submitted by a user 402. Likewise, keywords and phrases detected within a predicted next voice command may be designated as an alternate wakeup command for respective devices such that user 402 is not required to submit a wakeup command. Therefore, only a voice command is necessary to determine which device will be enabled. User 402 is enabled to submit a voice command without a wakeup command for a smart device trigger.

System 400 is configured to analyze a context of a voice command to trigger a respective smart device as described in the following example process scenario:

The process is initiated when user 402 speaks the term "Now" and in response, none of devices 408 (i.e., devices 408a, 408b, and 408c) will awake (i.e., become enabled for operation). When user 402 speaks the term "now set" device 408a (i.e., a washing machine) and device 408c (i.e., a microwave oven) will awake such that they are enabled for operation. When user 402 speaks the term "now set temperature" device 408a will go to sleep (i.e., become operationally disabled) and 408c will awake. Likewise, dynamic and situational commands may be advantageously utilized system 400 to trigger any of devices 408 instead of fixed wakeup command for each of devices 408. For example, conventional user 402 commands are given as follows:
1. Washing Machine (device 408a) please set mode 4 such that the washing Machine is triggered for operation.
2. Coffee machine (device 408b) prepare a cup of coffee such that the coffee machine is triggered for operation.
3. Microwave oven (device 408c) set the temperature to 180 degree such that the microwave over is triggered for operation.

System 400 is configured to identify that a respective smart device (of devices 408) must be triggered as soon as it analyzes the context of a command. Likewise, attention is given to an alternate wakeup command based on a contextual situation and predicted next command as follows:

A command: Please set mode 4 triggers (for operational functionality) device 408a (after analyzing command context).

A command: Prepare a cup of coffee triggers (for operational functionality) device 408b (after analyzing command context).

A command: Set the temperature to 180 degree Celsius triggers (for operational functionality) device 408c (after analyzing command context).

FIGS. 5A-5H, in combination, illustrate an activity based flow 500 for generating a dynamic wakeup command for control of devices, in accordance with embodiments of the present invention. Trigger word detection algorithm process 500 enables trigger word detection such that a model is trained with a dataset of trigger words 502 (e.g., "activate", "AI name", etc.) and a negative word that will not trigger the model to accept further instructions. Background noise may be added to the model to simulate a real environment. A number of "1s" for trigger words 502 are increased for accurately determining a presence of a trigger word. For example, a keyword such as "Instruction" or "start" may be used to train the model to start accepting instructions and ignore detected regular conversations thereby differing from usage of a trigger word for awakening each and every voice enabled system. A start word 504 (common to all devices) is configured to specify an instruction. For example, a user 501 may peak a start word and in response, a start word detector 506 enabled (i.e., represented with 1s). The number of 1's for trigger words are increased to accurately determine the presence of trigger word.

A process associated with a first time step 507 is executed as follows:

In step 508, user 501 does initiate any trigger word. Likewise, user 501 speaks an actual instruction comprising a start word that does not explicitly say which smart device the command refers to. In step 509, it is determined if the start word or instruction keyword is available within the input command from user 501. If the instruction keyword is detected as available within the input command, then in step 510, the command is transferred to a BERT model classifier component. If the instruction keyword is not detected as available within the input command, then in step 511, the user request is ignored as it is considered as background noise.

In step 512 (i.e., a first stage of the model) the BERT classifier component classifies and associates specified instructions for each device. The classification is performed based on generic learning within a generic set of instructions and reinforcement learning associated with a particular context. A resulting output provides a probability of a device corresponding to an inputted instruction set.

In step 514, it is determined if a maximum threshold has been reached for any class based on a probability output from the BERT classifier. If a maximum threshold has been reached for any class in the BERT classifier output, then in step 523, a voice controlled assistant acknowledges the request and triggers a corresponding smart device. If a maximum threshold has not been reached for any class in the BERT classifier output, then in step 516, the voice controlled assistant requests that user 501 verify context. For example, if there is a low confidence level between two or more devices, then step 518 determines a path 519 or a path 521.

Path 519 enables a classifier module for determining if historical context is available for tuning a probability towards a desired device. If any historical context is detected as previously available, then the model is configured to predict a corresponding class related to previous context and it increases a probability for that class.

If there is no clear historical context available previously, then path 521 is configured to request that user 501 specify a device for which the instruction is intended for.

Subsequently, a final output is predicted by the model as a respective device based on context and a corresponding device is triggered.

A process associated with a second time step 534 is executed as follows:

A portion of the model associated with second time step 534 is configured to specify that any instruction without a keyword is dis-regarded as generic conversation. The keyword may be common for all devices in a home or office environment. Second time step 534 is associated with a layer for avoiding voice enabled devices processing generic texts that are spoken but not intended for device activation.

A process associated with a third time step 538 is executed as follows:

A portion of the model associated with third time step 538 is configured to correctly classify (when there is an instruction to an alternative device such as a washing machine.) that the instruction is for a new device even through another device is already running and executing a previous instruction.

A process associated with a fourth time step 540 is executed as follows:

A portion of the model associated with fourth time step 540 is configured to allocate a new instruction without a trigger word and association with an intended device. The allocation is analyzed contextually with instructions already fed into other devices using BERT model trained with respect to a next sentence classifier for predicting if a current instruction comprises a continuation from a previous instruction such that a corresponding device is activated.

Figure 6:
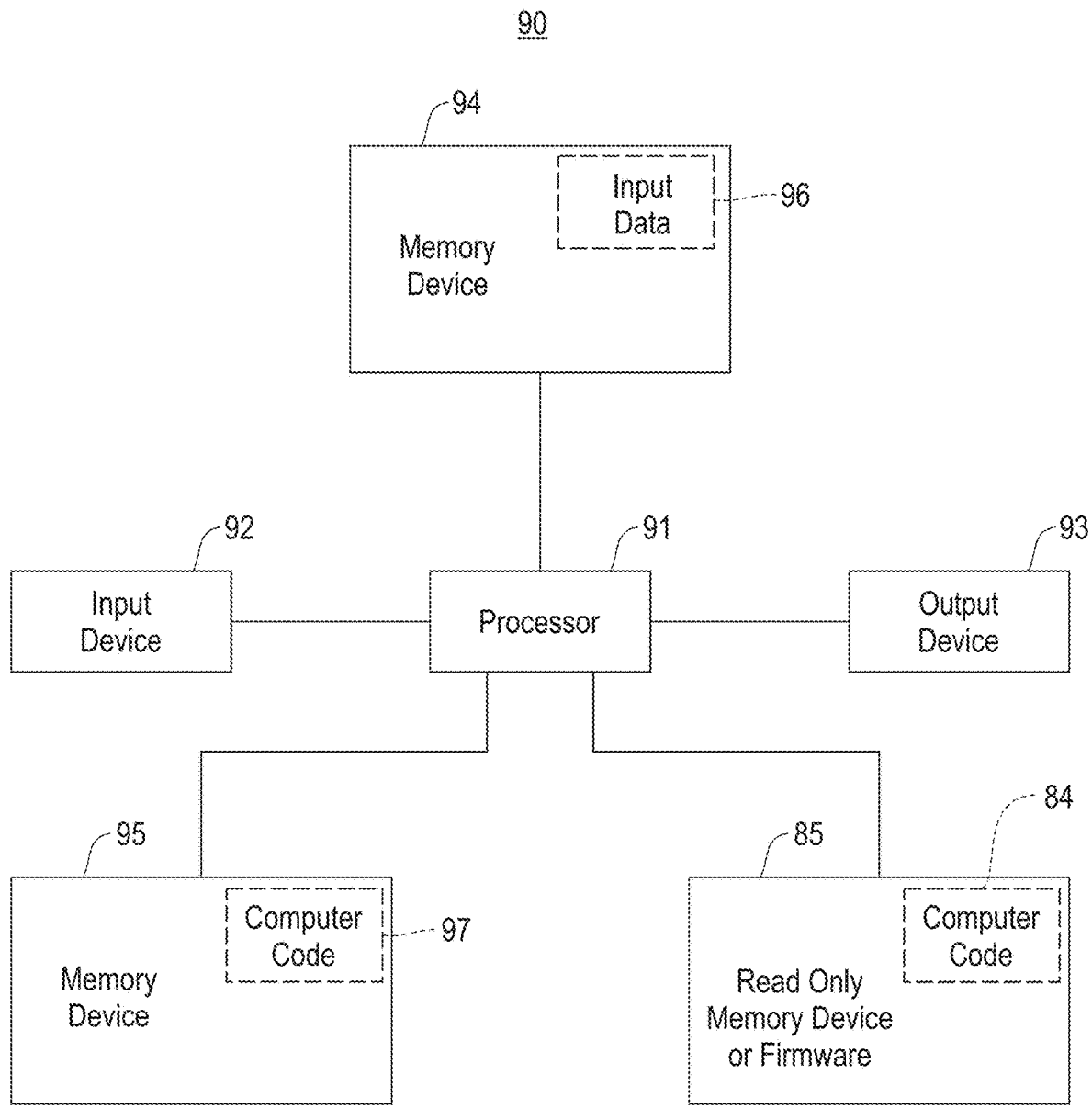
FIG. 6 illustrates a computer system used by the system of FIG. 1 for improving voice activated software technology associated with receiving initialization commands, classifying a device, and enabling the device with respect to an operationally functional state, in accordance with embodiments of the present invention.

FIG. 6 illustrates a computer system 90 (e.g., server 139, devices 140a . . . 140n, and BERT model component 115 of FIG. 1) used by or comprised by the system 100 of FIG. 1 for improving voice activated software technology associated with receiving initialization commands, classifying a device, and enabling the device with respect to an operationally functional state, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, spark, R language, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for improving voice activated software technology associated with receiving initialization commands, classifying a device, and enabling the device with respect to an operationally functional state. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 85) may include algorithms (e.g., the algorithm of FIG. 2) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as a Read-Only Memory (ROM) device 85, or may be accessed by processor 91 directly from such a static, nonremovable, read-only medium. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve voice activated software technology associated with receiving initialization commands, classifying a device, and enabling the device with respect to an operationally functional state. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving voice activated software technology associated with receiving initialization commands, classifying a device, and enabling the device with respect to an operationally functional state. In another embodiment, the invention provides a business method that performs the process steps of the invention on a subscription, advertising, and/or fee basis. That is, a service supplier, such as a Solution Integrator, could offer to enable a process for improving voice activated software technology associated with receiving initialization commands, classifying a device, and enabling the device with respect to an operationally functional state. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
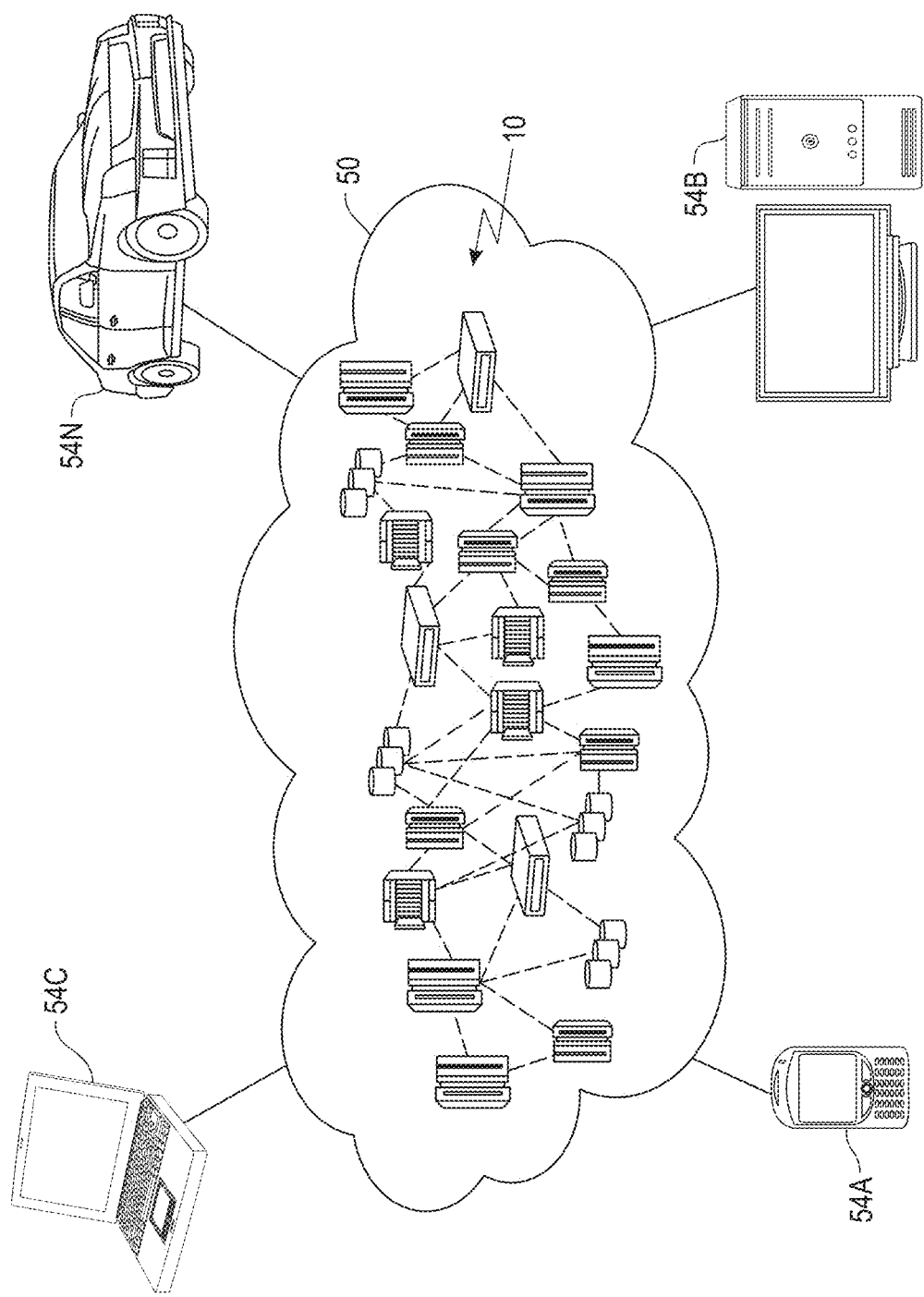
FIG. 7 illustrates a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 12 are intended to be illustrative only and that computing nodes 10 and cloud computing environment 50 can communicate with any type of computerized device over any type of network and/or network addressable connection (e.g., using a web browser).

Figure 8:
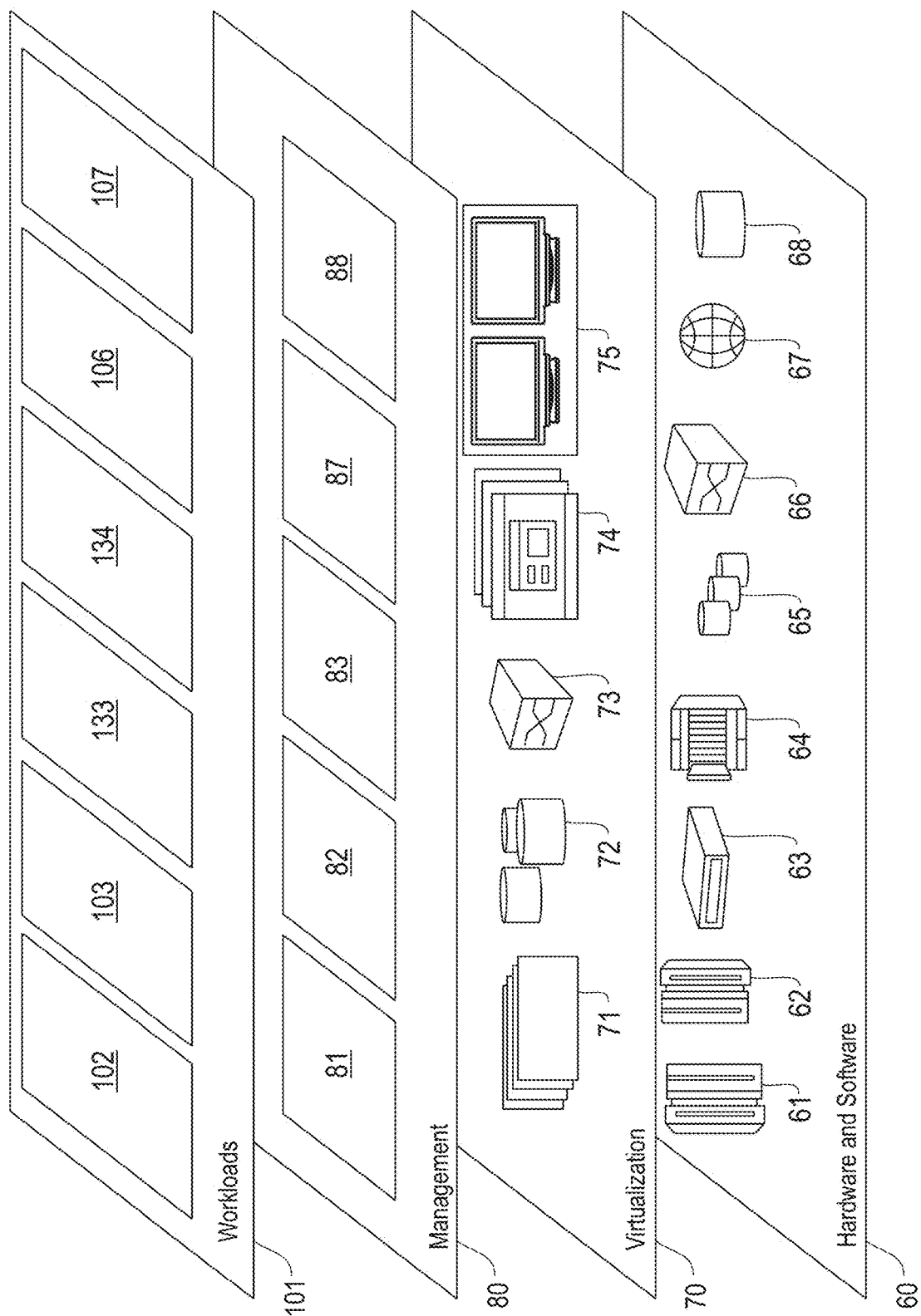
FIG. 8 illustrates a set of functional abstraction layers provided by cloud computing environment, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving voice activated software technology associated with receiving initialization commands, classifying a device, and enabling the device with respect to an operationally functional state 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A server comprising a processor coupled to a computer-readable memory unit, the memory unit comprising instructions that when executed by the processor implements a multiple voice activated hardware device enabling method, said method comprising:
receiving, by a processor of a server from a user, a user request comprising an instruction set comprising initialization commands associated with initializing at least one device of a plurality of devices;
analyzing, by the processor, the instruction set to determine whether or not the instruction set is background noise by determining whether or not the instruction set includes a start word, wherein a determination from said analyzing that the instruction set does not include, or does include, the start word specifies that the instruction is, or is not, background noise, respectively, wherein a presence of the start word in the instruction set does not wake up any device of the plurality of devices and does not identify the at least one device referred to in the instruction set, and wherein the presence of the start word in the instruction set initiates execution of a trigger word detection algorithm for detecting one or more trigger words configured to identify and wake up the at least one device;
first determining, by the processor in response to said analyzing having determined that the instruction set includes the start word and is not background noise, that specified instruction keywords are located within the initialization commands;
inputting, by the processor in response to results of said first determining, the initialization commands into a bidirectional encoder representations from transformers (BERT) model classifier component;
classifying, by the processor executing the BERT model classifier component, the plurality of devices associated with the instruction set, said classifying comprising ascertaining a probability for each class of devices from analysis of the instruction set;

second determining, by the processor based on the ascertained probability obtained from the BERT model classifier component, if a maximum threshold is reached for any class of devices via the ascertained probability of said any class of devices equalling or exceeding the threshold probability; and enabling, by the processor in response to at least one instruction keyword of the instruction keywords and results of said second determining, at least one device of the plurality of devices with respect to an operationally functional state, said enabling comprising waking up the at least one device to place the at least one device in the operationally functional state.

2. The server of claim 1, wherein the at least one device comprises a first device and a second device, and wherein the method comprises:

maintaining, in response to a second instruction keyword of the instruction keywords, said enabling the first device with respect to the operationally functional state; and disabling, in response to the second instruction keyword of the instruction keywords, the operationally functional state of the second device, said disabling causing the second device to go to sleep while the first device is maintained in the operationally functional state.

3. The server of claim 1, wherein the results of the second determining indicate that the maximum threshold is reached for said any class of devices and in response, the method comprises:

acknowledging, by the processor executing a voice controlled assistant, the instruction set; and triggering, by the processor in response to said acknowledging, said enabling the at least one device.

4. The server of claim 1, wherein the instruction set comprises voice activated commands associated with smart devices.

5. A multiple voice activated hardware device enabling method, said method comprising:

receiving, by a processor of a server from a user, a user request comprising an instruction set comprising initialization commands associated with initializing at least one device of a plurality of devices;

analyzing, by the processor, the instruction set to determine whether or not the instruction set is background noise by determining whether or not the instruction set includes a start word, wherein a determination from said analyzing that the instruction set does not include, or does include, the start word specifies that the instruction is, or is not, background noise, respectively, wherein a presence of the start word in the instruction set does not wake up any device of the plurality of devices and does not identify the at least one device referred to in the instruction set, and wherein the presence of the start word in the instruction set initiates execution of a trigger word detection algorithm for detecting one or more trigger words configured to identify and wake up the at least one device;

first determining, by the processor in response to said analyzing having determined that the instruction set includes the start word and is not background noise, that specified instruction keywords are located within the initialization commands;

inputting, by the processor in response to results of said first determining, the initialization commands into a bidirectional encoder representations from transformers (BERT) model classifier component;

classifying, by the processor executing the BERT model classifier component, the plurality of devices associated with the instruction set, said classifying comprising ascertaining a probability for each class of devices from analysis of the instruction set;

second determining, by the processor based on the ascertained probability obtained from the BERT model classifier component, if a maximum threshold is reached for any class of devices via the ascertained probability of said any class of devices equalling or exceeding the threshold probability; and enabling, by the processor in response to at least one instruction keyword of the instruction keywords and results of said second determining, at least one device of the plurality of devices with respect to an operationally functional state, said enabling comprising waking up the at least one device to place the at least one device in the operationally functional state.

6. The method of claim 5, wherein the at least one device comprises a first device and a second device, and wherein the method comprises:

maintaining, in response to a second instruction keyword of the instruction keywords, said enabling the first device with respect to the operationally functional state; and disabling, in response to the second instruction keyword of the instruction keywords, the operationally functional state of the second device, said disabling causing the second device to go to sleep while the first device is maintained in the operationally functional state.

7. The method of claim 5, wherein the results of the second determining indicate that the maximum threshold is reached for said any class of devices and in response, the method comprises:

acknowledging, by the processor executing a voice controlled assistant, the instruction set; and triggering, by the processor in response to said acknowledging, said enabling the at least one device.

8. The method of claim 5, wherein the instruction set comprises voice activated commands associated with smart devices.

9. A computer program product, comprising a computer readable hardware storage device storing a computer readable program code, said computer readable program code comprising an algorithm that when executed by a processor of a server implements a multiple voice activated hardware device enabling method, said method comprising:

receiving, by the processor from a user, a user request comprising an instruction set comprising initialization commands associated with initializing at least one device of a plurality of devices;

analyzing, by the processor, the instruction set to determine whether or not the instruction set is background noise by determining whether or not the instruction set includes a start word, wherein a determination from said analyzing that the instruction set does not include, or does include, the start word specifies that the instruction is, or is not, background noise, respectively, wherein a presence of the start word in the instruction set does not wake up any device of the plurality of devices and does not identify the at least one device referred to in the instruction set, and wherein the presence of the start word in the instruction set initiates execution of a trigger word detection algorithm for detecting one or more trigger words configured to identify and wake up the at least one device;

first determining, by the processor in response to said analyzing having determined that the instruction set includes the start word and is not background noise, that specified instruction keywords are located within the initialization commands;

inputting, by the processor in response to results of said first determining, the initialization commands into a bidirectional encoder representations from transformers (BERT) model classifier component;

classifying, by the processor executing the BERT model classifier component, the plurality of devices associated with the instruction set, said classifying comprising ascertaining a probability for each class of devices from analysis of the instruction set;

second determining, by the processor based on the ascertained probability obtained from the BERT model classifier component, if a maximum threshold is reached for any class of devices via the ascertained probability of said any class of devices equalling or exceeding the threshold probability; and enabling, by the processor in response to at least one instruction keyword of the instruction keywords and results of said second determining, at least one device of the plurality of devices with respect to an operationally functional state, said enabling comprising waking up the at least one device to place the at least one device in the operationally functional state.

10. The computer program product of claim 9, wherein the at least one device comprises a first device and a second device, and wherein the method comprises:

maintaining, in response to a second instruction keyword of the instruction keywords, said enabling the first device with respect to the operationally functional state; and disabling, in response to the second instruction keyword of the instruction keywords, the operationally functional state of the second device, said disabling causing the second.

11. The computer program product of claim 9, wherein the results of the second determining indicate that the maximum threshold is reached for said any class of devices and in response, the method comprises:

acknowledging, by the processor executing a voice controlled assistant, the instruction set; and triggering, by the processor in response to said acknowledging, said enabling the at least one device.

12. The server of claim 1, wherein the results of the second determining indicate that the maximum threshold is not reached for said any class of devices and in response, the method comprises:

determining, by the processor, that a historical context is available and in response, predicting, by the processor, a corresponding class of devices relating to the historical context, said corresponding class comprising the at least one device; and in response to said predicting, increasing, by the processor, the probability of the corresponding class to a probability that reaches the threshold probability and in response, triggering, by the processor, said enabling the at least one device.

13. The method of claim 5, wherein the results of the second determining indicate that the maximum threshold is not reached for said any class of devices and in response, the method comprises:

determining, by the processor, that a historical context is available and in response, predicting, by the processor, a corresponding class of devices relating to the historical context, said corresponding class comprising the at least one device; and in response to said predicting, increasing, by the processor, the probability of the corresponding class to a probability that reaches the threshold probability and in response, triggering, by the processor, said enabling the at least one device.

14. The computer program product of claim 9, wherein the results of the second determining indicate that the maximum threshold is not reached for said any class of devices and in response, the method comprises:

determining, by the processor, that a historical context is available and in response, predicting, by the processor, a corresponding class of devices relating to the historical context, said corresponding class comprising the at least one device; and in response to said predicting, increasing, by the processor, the probability of the corresponding class to a probability that reaches the threshold probability and in response, triggering, by the processor, said enabling the at least one device.

* * * * *